Dec. 26, 1922.
F. ODELL.
SAW SET.
FILED NOV. 3, 1921.
1,440,098.
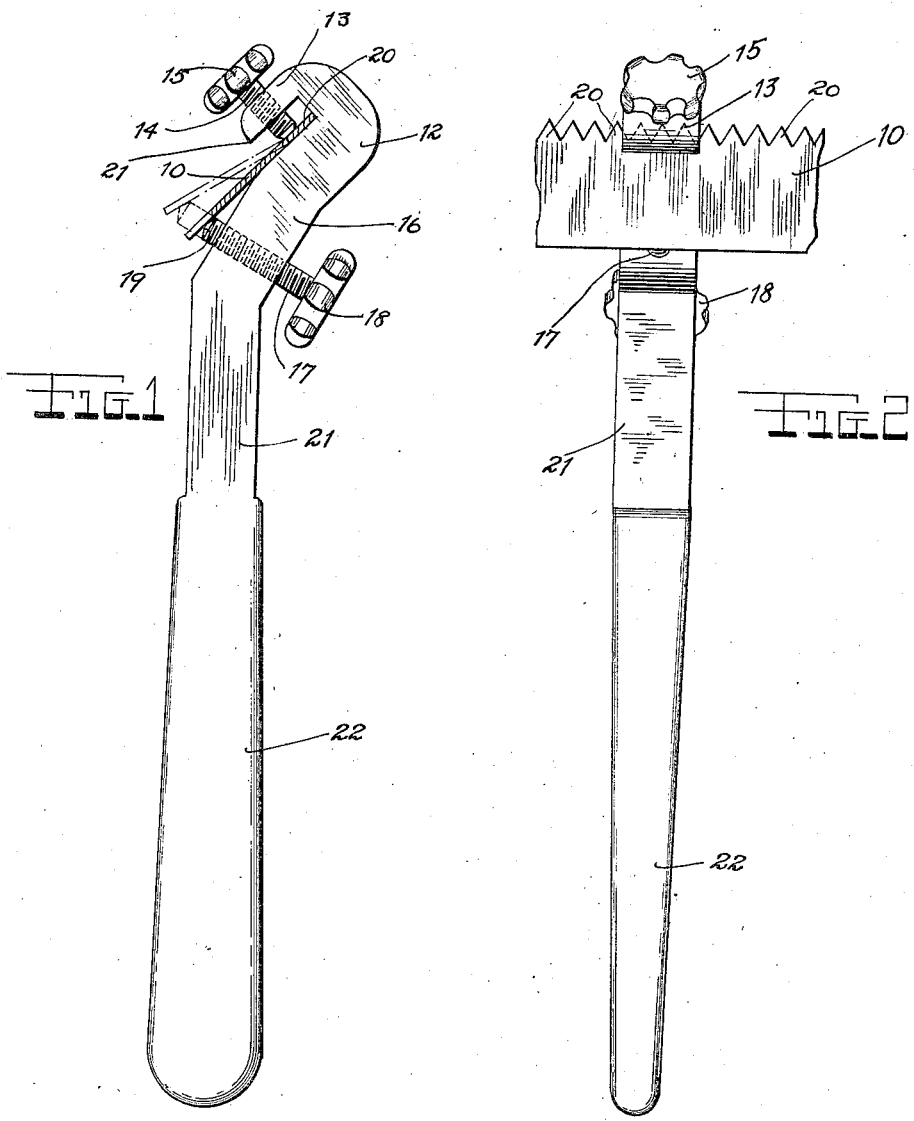
INVENTOR
F. Odell
BY
ATTORNEY

UNITED STATES PATENT OFFICE.

FREEMAN ODELL, OF LAKE GEORGE, NEW YORK.

SAW SET.

Application filed November 3, 1921. Serial No. 512,681.

*To all whom it may concern:*

Be it known that I, FREEMAN ODELL, a citizen of the United States, residing at Lake George, in the county of Warren and State of New York, have invented certain new and useful Improvements in Saw Sets, of which the following is a specification.

The invention relates to saw-setting tools and has for its main object the provision of a device which does not require the use of an anvil, hammer or other external means, having all the means for springing a saw tooth embodied within itself.

Another object is to provide a saw set slender in proportion, simple of manipulation, distinct in method of operation and comparatively inexpensive in cost of manufacture.

These and other objects will become apparent in the description below in which parent of reference will refer to the like-named parts in the drawing.

Referring briefly to the drawing, Figure 1 represents a side elevational view of the device and shows a saw (in cross section) secured in proper position thereto.

Figure 2 is a front elevational view of the device showing the saw in position, from a different angle.

Referring more in detail to the drawing the numeral 10 indicates the common type of flat saw which is clamped to the surface 11 of an open recess formed by the body extensions 12 and 13, the latter coincidentally superposing member 12.

The saw blade tooth 20 is securely held in mutual contact with the surface 11 by a screw 14 which threadably engages a hole in part 13. The screw is manipulated by rotating the head 15.

Part 16 slopes off angularly from part 12 and has located therein a threaded hole in which a screw 17 having a relatively large head 18 is threadably mounted. The screw fits rather tightly into the hole so as to resist any tendency to rotate when handling the saw set.

The extreme end of the screw 17 is formed into a conical surface 19 the apex of which engages the end of the saw blade 10. It is apparent from the drawing that, threading the screw 17 into the part 16, will cause one end of the saw blade 10 to be elevated until it comes in contact with the edge 21, the latter forming an angle gage for the set of the saw tooth. I illustrate, in Figure 1 by broken lines, the position a saw blade takes after the saw tooth has been set.

As each alternate tooth has been sprung thruout the length of the saw blade, the latter is then reversed or turned over after which the remaining teeth not set will be set at a divergent angle from each of the successive teeth, thereby giving a clearance for the remainder of the saw blade to enter into the saw slit.

A support 21 having an elongated handle 22 formed thereto is provided for conveniently holding the tool.

I claim:

1. A tool of the class described comprising a body member having an elongated handle and an extension formed thereto the latter adapted to lie in planes parallel to the body and forming a recess therebetween, a clamp screw threadably mounted in the said extension and adapted to secure a saw blade tooth in the recess and means for gaging the angular set of a saw.

2. A tool of the class described comprising a main body having an elongated handle member and an extension formed thereto and adapted to form an open recess between the extension and the main body member, said extension having a screw threadably engaged therein, a similar screw threadably mounted in the main body member having a conical surface formed thereon, the latter named screw adapted to elevate one edge of the saw blade until it contacts with the nearest edge of the body extension.

In witness whereof I affix my signature.

FREEMAN ODELL.